United States Patent
Cotton et al.

(10) Patent No.: US 7,967,239 B2
(45) Date of Patent: Jun. 28, 2011

(54) ROTOR DRIVE AND CONTROL SYSTEM FOR A HIGH SPEED ROTARY WING AIRCRAFT

(75) Inventors: Bryan Saxon Cotton, Millport, NY (US); Thomas L. Tully, Jr., Oxford, CT (US); Yuriy Z. Gmirya, Woodbridge, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 996 days.

(21) Appl. No.: 11/140,695

(22) Filed: May 31, 2005

(65) Prior Publication Data

US 2006/0269413 A1    Nov. 30, 2006

(51) Int. Cl.
*B64C 27/08* (2006.01)
(52) U.S. Cl. ............... 244/17.19; 244/17.23; 244/60
(58) Field of Classification Search ............. 244/60, 244/17.11, 17.19, 17.21, 10, 7 A; 416/33, 416/43
See application file for complete search history.

(56) References Cited

U.S. PATENT DOCUMENTS

| | | | | | |
|---|---|---|---|---|---|
| 2,041,789 | A | * | 5/1936 | Stalker | 244/17.19 |
| 2,420,764 | A | * | 5/1947 | Zuck | 244/51 |
| 2,644,533 | A | * | 7/1953 | Maillard et al. | 416/20 R |
| 2,698,147 | A | * | 12/1954 | Hovgard | 244/7 R |
| 2,731,215 | A | * | 1/1956 | Avery | 244/17.13 |
| 2,959,373 | A | * | 11/1960 | Zuck | 244/7 C |
| 3,506,219 | A | * | 4/1970 | Mouille et al. | 244/17.21 |
| 3,628,755 | A | * | 12/1971 | Nagler | 244/17.21 |
| 4,488,851 | A | * | 12/1984 | Young | 416/33 |
| 4,531,692 | A | * | 7/1985 | Mateus | 244/17.19 |
| 5,738,301 | A | * | 4/1998 | Francois et al. | 244/17.19 |
| 6,065,718 | A | * | 5/2000 | Piasecki | 244/17.11 |
| 6,086,016 | A | * | 7/2000 | Meek | 244/17.11 |
| 7,434,764 | B2 | * | 10/2008 | Lappos et al. | 244/17.11 |

* cited by examiner

*Primary Examiner* — Benjamin P Lee
(74) *Attorney, Agent, or Firm* — Carlson Gaskey & Olds PC

(57) ABSTRACT

A drive system for a high speed rotary-wing aircraft includes a combiner gearbox in meshing engagement with a main gearbox. The combiner gearbox is driven by one or more engines such that a main rotor system and a translational thrust system are driven thereby. The engine drives the combiner gearbox and thus the main gearbox through an overrunning clutch. The drive system permits the main rotor system RPM to be controlled by offloading power to the translational thrust system during a high speed flight profile.

17 Claims, 5 Drawing Sheets

ROTOR DRIVE AND CONTROL SYSTEM FOR A HIGH SPEED ROTARY WING AIRCRAFT

BACKGROUND OF THE INVENTION

The present invention relates to a rotary-wing aircraft, and more particularly to a drive arrangement for a high speed compound or coaxial contra-rotating rotor aircraft in which a translational propulsion system provides translational thrust while the main rotor system is operated at a reduced airspeed in a reverse airflow condition during high speed flight.

The forward airspeed of a conventional rotary wing aircraft is limited by a number of factors. Among these is the tendency of the retreating blade to stall at high forward airspeeds. As the forward airspeed increases, the airflow velocity across the retreating blade slows such that the blade may approach a stall condition. In contrast, the airflow velocity across the advancing blade increases with increasing forward speed. Dissymmetry of lift is thereby generated by forward movement of the helicopter.

This dissymmetry may create an unstable condition if lift is not equalized across the advancing and retreating sectors of the rotor disc. Typically, blade flapping and feathering are utilized to generally equalize the lift.

However, as the forward airspeed is increased beyond a given point for a given rotor rpm, the flapping and feathering action eventually becomes inadequate to maintain substantial equality of lift over the rotor disc. At this point, reverse airflow across the retreating blade creates negative lift and, depending on the forward speed, creates a stalling or negative lift condition that travels outwardly across the blade as airspeed increases. Conventional rotors must be operated at airspeeds lower than those which cause reverse airflow across a substantial part of the retreating blade and at an rpm lower than that which would cause compressibility Mach number problems at the tip of the advancing blade. This has effectively limited forward airspeeds of conventional helicopters to approximately 180 knots.

A rotary wing aircraft with a coaxial contra-rotating rigid rotor system is capable of higher speeds compared to conventional single rotor helicopters due in part to the balance of lift between the advancing sides of the main rotor blades on the upper and lower rotor systems. In addition, the retreating side of the rotor discs are also generally free from classic retreating blade stall that conventional single or tandem rotor helicopters may suffer from.

To still further increase airspeed, a compound or coaxial contra-rotating rigid rotor aircraft operates a system in autorotation with supplemental translational thrust being provided by turbojet engines. In high speed flight, the main rotor system is unloaded from the main rotor drive engines (or turboshafts), and means for controlling rotor RPM is limited to adjusting collective pitch. For any helicopter in autorotation increasing collective pitch slows the rotational speed and decreasing collective pitch increases rotational speed. For a rotary wing aircraft in a high speed flight profile, however, rotor RPM is preferably decreased to prevent the rotor blade tips on the advancing sides of the rotor discs from entering a supersonic region as the aircraft airspeed increases. The necessary RPM reduction from hover to high speed is typically on the order of 30%. Generally speaking, autorotation is a rotary wing flight condition where the force to turn the blades comes from airflow to the underside of the rotors. The source of this airflow generally is from either the downward motion of an aircraft, such as would happen after engine failure, or forward motion of an aircraft, such as level flight in an autogiro.

As airspeed increases, collective pitch is increased to prevent the rotor RPM from increasing to an undesirable level. This requires the advancing side angle of attack (AOA) to increase as speed increases, which in turn generates more lift, more induced drag and a larger bending moment on the shaft of the main rotor. The increased lift is generally balanced by the retreating side of the rotor disc. Because an inboard portion of the retreating side is in reverse flow, and because of the collective pitch, the AOA goes negative. This generates negative lift. The moment generated from the increased lift on the advancing side adds to the moment generated from the negative lift on the retreating side. This moment is generally canceled by an equal and opposite moment by the other rotor in a coaxial, contra-rotating rotor system. However, any variation in the phase or magnitude of the upper and lower rotor system generates vibration that is propagated to the rest of the airframe.

Accordingly, it is desirable to provide a rotor drive and control system for a high speed rotary-wing aircraft which minimizes a major source of vibration and commensurate performance degradation.

SUMMARY OF THE INVENTION

A drive system for a high speed rotary-wing aircraft according to the present invention may include a dual, contra-rotating, coaxial rotor system and a translational thrust system to provide translational thrust generally parallel to an aircraft longitudinal axis while the rotor system is operating in an autorotative or reverse flow state during a high-speed forward flight profile.

A combiner gearbox in meshing engagement with a main gearbox is driven by one or more engines such that the main gearbox and the translational thrust system are driven therethrough. The engine drives the combiner gearbox and the main gearbox through an overrunning clutch.

The drive system permits the RPMs of the main rotor system to be controlled by offloading torque to the translational thrust system. That is, torque generated by the main rotor system from autorotation during high speed flight is absorbed by the translational thrust system so that the advancing side of the main rotor blades does not reach supersonic speeds and the retreating side of the main rotor blades may be placed in flat pitch as a result of using low collective and differential lateral cyclic such that the negative lift on the retreating side is eliminated and the upward lift on the advancing side is reduced. Thus, reducing vibrations to the airframe.

Preferably, the drive system is configured so that during engine failure, the pusher propeller of the translational thrust system is set to flat pitch otherwise the load imposed on the drive system would slow the rotor system and prevent an autorotative landing.

The present invention therefore provides a rotor drive and control system for a high speed rotary-wing aircraft which minimizes a major source of vibration and performance degradation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
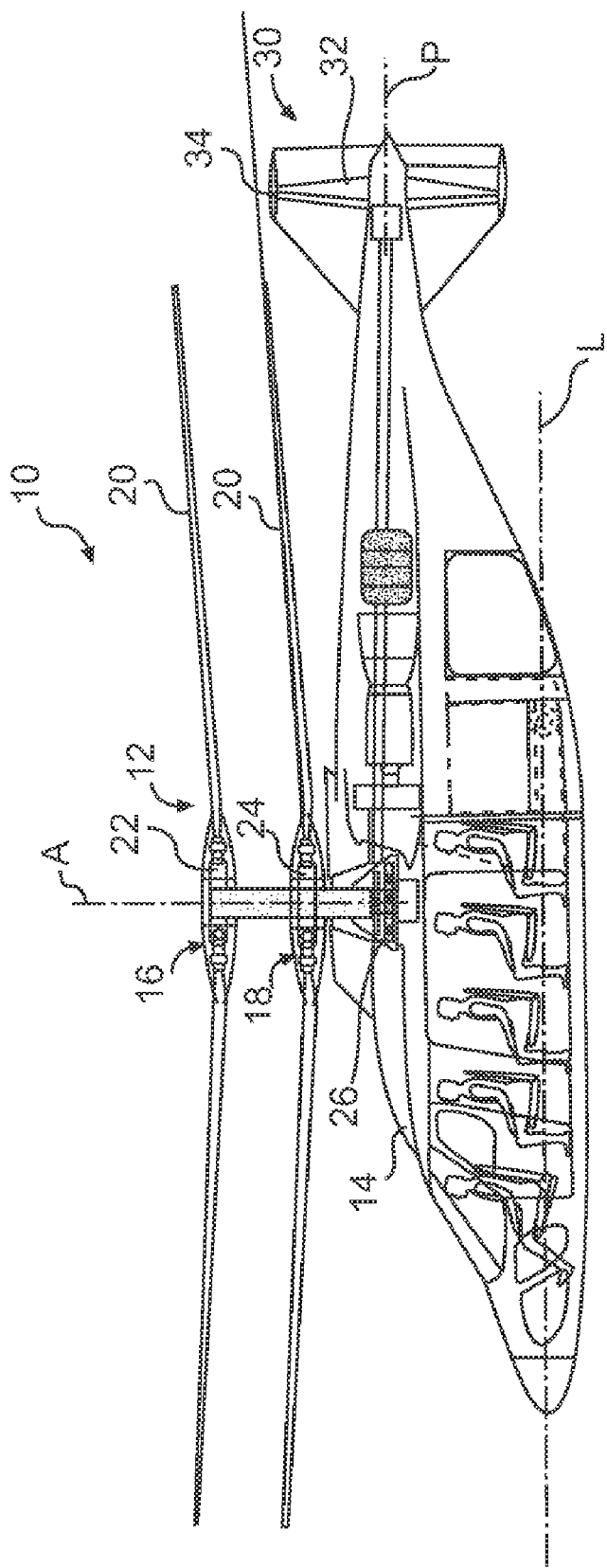
FIGS. 1A-1B are general views of an exemplary rotary wing aircraft embodiment for use with the present invention.
Figure 1B:
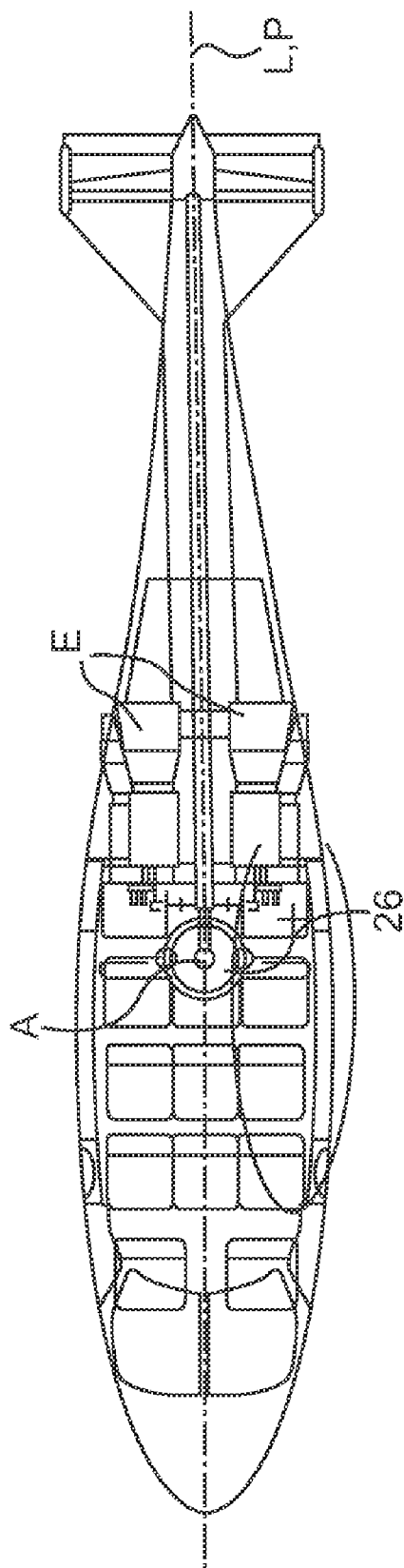

FIG. 1A-1B illustrates a vertical takeoff and landing (VTOL) high speed compound or coaxial contra-rotating rigid rotor aircraft (collectively rotary-wing aircraft) 10 having a dual, contra-rotating, coaxial main rotor system 12, which rotates about a rotor axis of rotation A. The aircraft 10 includes an airframe 14 which supports the dual, contra-rotating, coaxial main rotor system 12 as well as a translational thrust system 30 which provides translational thrust generally parallel to an aircraft longitudinal axis L while the main rotor system 12 is operating in an autorotative or reverse flow state during a high-speed forward flight profile. It should be understood that other aircraft configurations will benefit from the present invention.

The main rotor system 12 includes a first rotor system 16 and a second rotor system 18 each rotor system 16, 18 includes a multiple of rotor blades 20 mounted to a rotor hub 22, 24. The main rotor system 12 is driven by a main gearbox 26. The translational thrust system 30 may be any system known in the art including, but not limited to a tractor propeller, side mounted propellers, etc. Preferably, the translational thrust system 30 includes a pusher propeller 32 with a propeller rotational axis P oriented substantially horizontal and parallel to the aircraft longitudinal axis L to provide thrust for high-speed flight. The pusher propeller 32 may be mounted within an aerodynamic cowling 34 mounted to the rear of the airframe 14. The translational thrust system 30 is preferably driven by the same main gearbox 26 which drives the rotor systems 16, 18.

Figure 2:
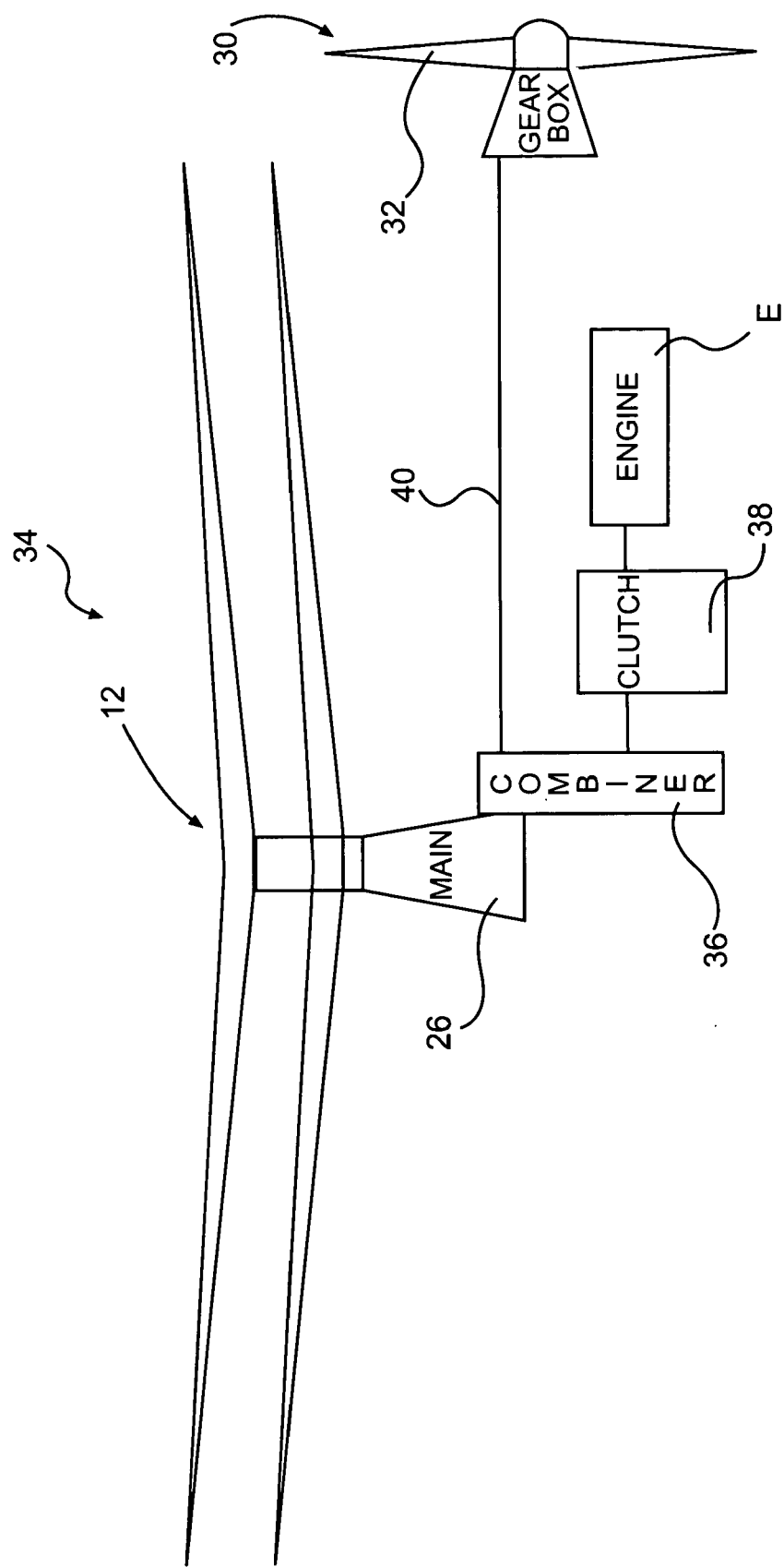
FIG. 2 is a block diagram of a drive system of the present invention.

Referring to FIG. 2, the drive system 34 of the aircraft 10 is schematically illustrated. As shown, the main gearbox 26 is mechanically connected to the main rotor system 12 and to the translational thrust system 30 so that the main rotor system 12 and the translational thrust system 30 are both driven by the main gearbox 26. The drive system 34 may further include a combiner gearbox 36 in meshing engagement with the main gearbox 26. As shown, the combiner gearbox 36 may be driven by one or more engines E. The engines E drive the combiner gearbox 36 and thus the main gearbox 26 through a disconnecting mechanism, preferably, an overrunning clutch 38. The translational thrust system 30 preferably includes a drive shaft 40 which is driven by the combiner gearbox 36. It should be understood that although the combiner gearbox 36 is schematically illustrated as a separate component, the combiner gearbox 36 may alternatively be incorporated directly into the main gearbox 26.

This drive arrangement permits the RPMs of the rotor system 12 to be controlled so that the advancing sides of the main rotor blades do not reach supersonic speeds by offloading torque to the translational thrust system 30. That is, torque generated by the main rotor system 12 during autorotation in a high speed flight profile is absorbed by the translational thrust system 30. This arrangement is possible because the translational thrust system 30 requires significantly more power during high speed flight than the main rotor system 12 generates while the main rotor system 12 is designed to absorb less horsepower than the translational thrust system 30. In one concept developed by Applicant, the main rotor system 12 absorbs approximately 400 horsepower, and the translational thrust system 30 absorbs approximately 1200 horsepower during high speed flight. With respect to power demand, the aircraft 10 is opposite from that of a conventional helicopter in which the main rotor is the primary recipient of horsepower in the case of a dual engine failure, the anti-torque tail rotor continues to rotate in a speed proportional to the main rotor to maintain yaw control during autorotation. Here, it is the large power demand on the translational thrust system 30 that provides the ability to slow the main rotor system 12 with a mechanical link between the two.

Figure 3:
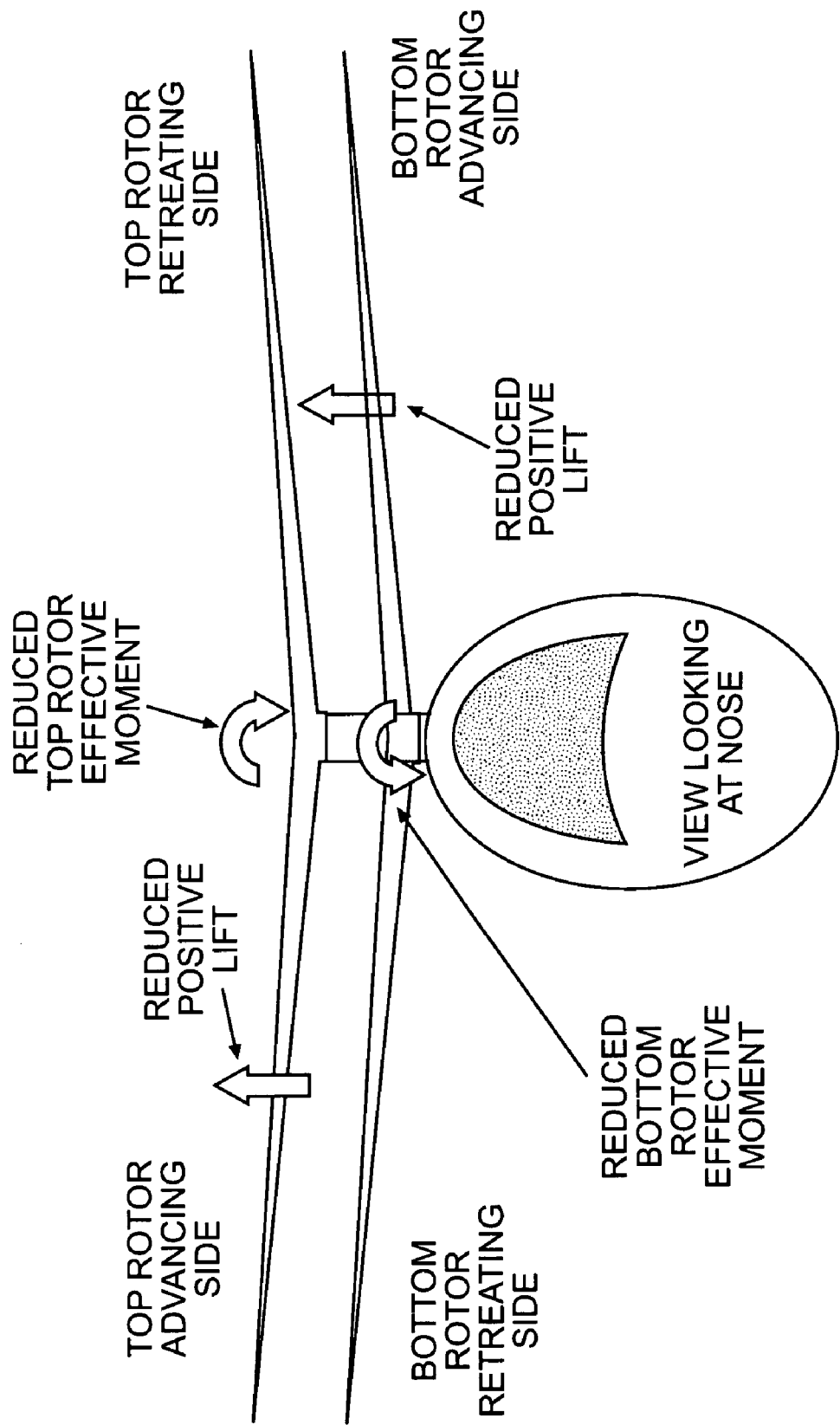
FIG. 3 is a schematic view of the main rotor dynamics of a coaxial counter rotating rotor system.

Offloading power from the main rotor to the propeller reduces the main rotors' RPMs and therefore allows (Referring to FIG. 3), the retreating blade to be placed in flat pitch with low collective and differential lateral cyclic such that the negative lift on the retreating side is eliminated and the upward lift on the advancing side is reduced. In other words, during the high speed flight profile, the advancing disc sectors generates reduced positive lift while the retreating disc sections general little to no positive lift variations of phase or magnitude between the upper and lower rotor systems 16, 18 is thereby minimized which minimizes vibration propagation to the airframe. Minimization of vibration permits operations at higher airspeeds for prolonged time periods over conventional coaxial, contra-rotating systems.

As the aircraft airspeed increases or the main rotor system 12 overspeeds due to transient maneuvering conditions, the additional rotor speed will be absorbed by the translational thrust system 30. That is, the translational thrust system operates to brake the overspeeding main rotor system 12.

As previously stated, the overrunning clutch 38 is located in-between the one or more engines E and combiner gearbox 36. This is significant since, during an engine failure, the pusher propeller 32 of the translational thrust system 30 must be set to a flat pitch otherwise the load imposed on the drive system 34 will slow the rotor system 12 and prevent an autorotative landing.

Figure 4:
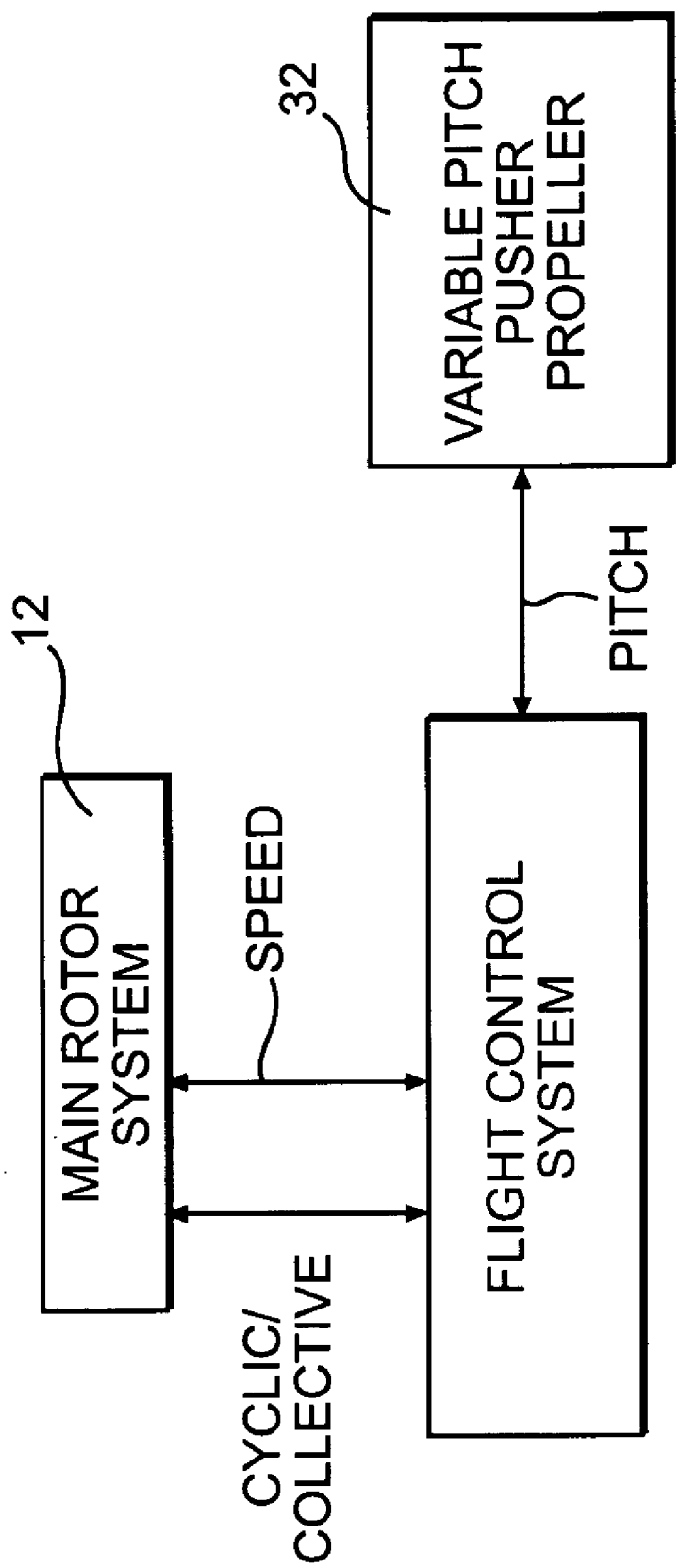
FIG. 4 is a block diagram of a flight control system.

The pusher propeller 32 is preferably a variable pitch propeller controlled by a flight control system (illustrated schematically in FIG. 4) which operates to adjust the pitch of the pusher propeller 32 in response to predefined situations such as an engine failure and in response to transient overspeeding of the main rotor system 12. That is, the variable pitch pusher propeller 32 provides additional fidelity for the offloading of torque from the rotor system 12 as well as refined rotor system 12 speed control.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A drive system for a rotary-wing aircraft comprising:
a combiner gearbox drivable by an engine through an overrunning clutch;
a main gearbox driven by said combiner gearbox;
a main rotor system driven by said main gearbox;
a translational thrust system driven by said combiner gearbox such that torque generated by said main rotor system is offloaded to said translational thrust system through said main gearbox and said combiner gearbox to brake said main rotor system so that an advancing side of said main rotor system does not exceed supersonic speed while said main rotor system is in an reverse flow state during a high speed flight profile.

2. The drive system as recited in claim 1, wherein said translational thrust system includes a pusher propeller.

3. The drive system as recited in claim 1, wherein said main rotor system absorbs less power than said translational thrust system while said main rotor is in said reverse flow state.

4. The drive system as recited in claim 1, wherein said main rotor system includes a coaxial contra-rotating rotor system.

5. The drive system as recited in claim 1, wherein said overrunning clutch overruns when said main rotor system overspeeds a predetermined value such that torque generated by said main rotor system is absorbed by said translational thrust system through said combiner gearbox.

6. The drive system as recited in claim 1, wherein said high speed flight profile is above 180 knots.

7. The drive system as recited in claim 1, further comprising placing a retreating side of said main rotor system in flat pitch while said main rotor system is in said reverse flow state during said high speed flight profile.

8. The drive system as recited in claim 1, wherein said main rotor system absorbs approximately ⅓ of engine power than said translational thrust system while said main rotor is in said reverse flow state during said high speed flight profile.

9. A method of controlling a main rotor system of a rotary-wing aircraft while the main rotor is in an reverse flow comprising:
offloading torque generated by the main rotor system to a translational thrust system to brake the main rotor system through a main gearbox so that an advancing side of the main rotor system does not exceed supersonic speed while the main rotor system is in an reverse flow state during a high speed flight profile.

10. A method as recited in claim 9, further comprising:
driving the main gearbox which drives the main rotor through an overrunning clutch.

11. A method as recited in claim 10, further comprising:
driving the main gearbox through a combiner gearbox, the combiner gearbox driven by the overrunning clutch; and
driving the translational thrust system through the combiner gearbox.

12. A method as recited in claim 10, further comprising:
locating the overrunning clutch directly mechanically downstream of an engine.

13. A method as recited in claim 9, further comprising:
identifying an engine failure; and
setting a pitch of a pusher propeller of the translational thrust system to a flat pitch in response to said identifying.

14. A method as recited in claim 9, further comprising:
directly driving a combiner gearbox with an engine; and
driving the main rotor system with a main gearbox driven by the combiner gearbox; and
driving the translational thrust system through the combiner gearbox.

15. A method as recited in claim 9, wherein offloading torque includes adjusting a pitch of a pusher propeller of the translational thrust system.

16. A method as recited in claim 9, further comprising defining the high speed flight profile to be above 180 knots.

17. A method as recited in claim 9, further comprising:
placing a retreating side of the main rotor system in flat pitch while the main rotor system is in the reverse flow state during the high speed flight profile.

* * * * *